(12) United States Patent
Moore et al.

(10) Patent No.: US 8,418,960 B2
(45) Date of Patent: Apr. 16, 2013

(54) PLATFORM

(75) Inventors: John Moore, Bristol (GB); Thomas Williams, Bristol (GB)

(73) Assignee: Airbus Operations Limited, Bristol (GB)

( * ) Notice: Subject to any disclaimer, the term of this patent is extended or adjusted under 35 U.S.C. 154(b) by 824 days.

(21) Appl. No.: 12/310,078

(22) PCT Filed: Aug. 3, 2007

(86) PCT No.: PCT/GB2007/050469
§ 371 (c)(1),
(2), (4) Date: Feb. 10, 2009

(87) PCT Pub. No.: WO2008/020248
PCT Pub. Date: Feb. 21, 2008

(65) Prior Publication Data
US 2009/0321563 A1    Dec. 31, 2009

(30) Foreign Application Priority Data

Aug. 17, 2006 (GB) .................................. 0616406.5

(51) Int. Cl.
*B64C 1/00* (2006.01)
(52) U.S. Cl.
USPC ............... 244/123.1; 244/123.7; 244/123.8
(58) Field of Classification Search .................. 182/223; 29/897.2, 525.01; 244/117 R, 123.1, 123.7, 244/131.1, 123.8
See application file for complete search history.

(56) References Cited

U.S. PATENT DOCUMENTS

| | | | | |
|---|---|---|---|---|
| 1,776,565 A | * | 9/1930 | Morton | 182/223 |
| 1,841,676 A | * | 1/1932 | Roberts | 182/183.1 |
| 1,906,823 A | * | 5/1933 | Sikorsky | 244/87 |
| 2,344,044 A | * | 3/1944 | Koch | 244/218 |
| 2,354,906 A | * | 8/1944 | Bailey et al. | 182/119 |
| 2,362,170 A | * | 11/1944 | Swaisgood | 182/1 |
| 2,378,043 A | * | 6/1945 | Sorensen et al. | 29/464 |

(Continued)

FOREIGN PATENT DOCUMENTS

| | | |
|---|---|---|
| DE | 36 37 490 | 5/1988 |
| FR | 2 471 467 | 6/1981 |

(Continued)

OTHER PUBLICATIONS

International Search Report for PCT/GB2007/050469, mailed Nov. 6, 2007.

(Continued)

*Primary Examiner* — Timothy D Collins
*Assistant Examiner* — Jamie S Stehle
(74) *Attorney, Agent, or Firm* — Nixon & Vanderhye P.C.

(57) ABSTRACT

A rib bay platform for use in an aircraft rib bay, is adjustable in length (for example it comprises two telescopically mounted sections. The platform comprises a first end configured for mounting on a stringer of the rib bay (for example by an interference fit), and a second end configured for mounting on another stringer of the rib bay (for example on feet mounted on ball-and-socket joints). A method of operating in an aircraft rib bay comprises the steps of providing a rib bay platform of adjustable length; adjusting the length of the platform; mounting the platform between the two stringers; whereby a person may then operate inside the aircraft rib bay while being supported on the platform.

17 Claims, 3 Drawing Sheets

U.S. PATENT DOCUMENTS

| | | | | |
|---|---|---|---|---|
| 2,403,569 A | * | 7/1946 | Watter | 244/124 |
| 2,485,165 A | | 10/1949 | Pollman | |
| 2,570,076 A | * | 10/1951 | Sims | 182/146 |
| 2,593,714 A | * | 4/1952 | Robinson | 156/156 |
| 2,656,223 A | * | 10/1953 | Gray | 182/119 |
| 3,213,964 A | * | 10/1965 | Tucker et al. | 182/119 |
| 3,302,751 A | * | 2/1967 | Ahlberg | 182/118 |
| 3,556,254 A | | 1/1971 | Lambert | |
| 4,583,618 A | * | 4/1986 | Zimmerman | 182/223 |
| 4,633,632 A | * | 1/1987 | Sarh | 52/245 |
| 4,717,330 A | * | 1/1988 | Sarh | 425/403 |
| 5,033,178 A | * | 7/1991 | Woods | 29/281.1 |
| 5,138,800 A | * | 8/1992 | Janusz | 451/5 |
| 5,902,535 A | * | 5/1999 | Burgess et al. | 264/257 |
| 6,098,927 A | * | 8/2000 | Gevers | 244/123.8 |
| 2003/0178253 A1 | * | 9/2003 | Tatge et al. | 182/132 |

FOREIGN PATENT DOCUMENTS

| | | |
|---|---|---|
| FR | 2 663 075 | 12/1991 |
| FR | 2 843 416 | 2/2004 |
| GB | 2 163 204 | 2/1986 |
| JP | 53-16636 | 7/1951 |
| JP | 60-30760 | 2/1985 |
| JP | 3-51478 | 3/1991 |
| JP | 11-324315 | 11/1999 |
| WO | WO 2006/137994 | 12/2006 |

OTHER PUBLICATIONS

United Kingdom Search Report for GB Application No. 0616406.5, dated Nov. 30, 2006.

English translation of Office Action dated Apr. 5, 2012 in JP 2009-524238.

* cited by examiner

PLATFORM

This application is the U.S. national phase of International Application No. PCT/GB2007/050469, filed 3 Aug. 2007, which designated the U.S. and claims priority to Great Britain Application No. 0616406.5, filed 17 Aug. 2006, the entire contents of each of which are hereby incorporated by reference.

BACKGROUND OF THE INVENTION

The present invention relates to a method of operating in an aircraft wing rib bay and a platform for use in an aircraft wing rib bay.

During aircraft wing manufacture it is often necessary to access the interior of the wing rib bay in order to perform various manufacturing operations, such as applying sealant in the wing box. The interior of the wing is typically accessed by an engineer climbing through a man-access hole in the wing skin. The wing is usually manufactured on its side to save space in the production facility, so once inside the rib bay, the engineer, in known manufacturing techniques, tends to need support himself directly on stringers on the interior surface of the wing skin.

This practice can cause a number of problems. Firstly, the engineer can significantly damage the stringers by putting his weight on fragile parts of the structure or by placing too much weight on a small area. In addition, it can be tiring and dangerous for the engineer to work in such a position.

SUMMARY OF THE INVENTION

The present invention seeks to mitigate or remove at least some of the above-mentioned problems. Alternatively or additionally, the present invention seeks to improve the accessibility of an aircraft wing rib bay interior.

The present invention provides a method of operating in an aircraft rib bay, comprising the steps of: providing a rib bay platform of adjustable length; adjusting the length of the platform so as to match the distance between two stringers located on either side of the rib bay; and mounting the platform between the two stringers; whereby a person may then operate inside the aircraft rib bay whilst being supported on the platform. The present invention therefore enables an engineer to create a region inside the wing rib bay on which he can safely position himself, and from which he can safely perform operations such as standing on the platform to inspect the rib bay, applying sealant, fitting nuts/bolts to the rib bay interior, and/or using the platform as a support for tools etc.

The rib bay platform is adjustable in length and the method may therefore be implemented at a variety of positions within the rib bay using the same platform. The platform is preferably repeatedly extendable and retractable in length. In adjusting the length of the platform, there is preferably no mass, or structure, added or removed from the platform.

The method may comprise the step of mounting the platform, at either end, on the stringers. At least one end of the platform may be rested on a stringer. At least one end of the platform may be grippingly mounted on, or around, a stringer.

The method may comprise a step of grippingly mounting one end of the platform on one of the two stringers. The method may comprise the step of extending the platform, once so mounted, towards the other stringer. Thus the operator may be able to adjust the length of the platform (for example by pulling along the length of the platform) without directly holding the first end (that first end being grippingly mounted on the first stringer) thereby facilitating relatively straightforward adjustment of the platform length.

The method may comprise the step of grippingly mounting one end of the platform on one of the two stringers, and then mounting the other end of the platform on the other stringer. The platform may be adjusted in length to match the distance between the two stringers before, or more preferably after, one end has been grippingly mounted.

The method may comprise the step of locking the platform to its adjusted length, for example before operating from the platform.

The method may comprise the steps of removing the platform from the stringers, adjusting the length of the platform so as to match the distance between two other stringers located on either side of the rib bay; and mounting the platform between the other two stringers. A person may then operate inside the aircraft rib bay whilst being supported on the platform in the new position defined between the two other stringers.

The method may comprise the steps of providing a second platform of adjustable length; adjusting the length of the second platform so as to match the distance between two stringers located on either side of the rib bay; and mounting the second platform between the two stringers.

The second platform may be mounted at a different location along the chord of the wing from the other platform. The second platform may be mounted at a different location along the span of the wing from the other platform. The second platform may be mounted at a different location along both the chord and span of the wing from the other platform, thereby forming a tiered arrangement of platforms. The tiered arrangement may be particularly beneficial as it enables an operator to move relatively easily up and down the wing rib bay. The second platform may be mounted at the same chord-wise location in the rib bay as the other platform. For example, the platforms may be mounted side-by-side, thereby forming a single relatively wide platform.

The method may comprise the steps of providing a multiplicity of rib bay platforms of adjustable length, and mounting them in the wing rib bay in accordance with any aspect of the present invention.

As the skilled person will appreciate, an aircraft wing is typically constructed on its side (i.e. with the chord running vertically). Reference herein to directions and dimensions should be interpreted with the wing in this orientation unless otherwise stated. The stringers will thus typically be positioned so that the majority run in a substantially horizontal direction.

The rib bay may comprise composite stringers. The method of the present invention is particularly of use in such a rib bay as these composite stringers can be more susceptible to the high, point loads, caused by an operator directly climbing on the stringers.

According to another aspect of the invention, there is provided a rib bay platform for use in an aircraft rib bay, wherein the rib bay platform is adjustable in length and comprises a first end configured for mounting on a first stringer of the rib bay, and a second end configured for mounting on a second stringer of the rib bay.

The first end of the platform is preferably configured to abut, in use, the base of the first stringer (i.e. the portion of the stringer closest to the wing skin). The second end of the platform is preferably configured to abut, in use, the base of the second stringer.

The first end is preferably configured for mounting, and more preferably grippingly mounting, on the first stringer. The first end may be configured to resist, and preferably to substantially prevent, when so mounted, relative movement between the first end of the platform and the stringer, in a direction along the length of the platform.

Alternatively or additionally, the first end may be configured for mounting, and preferably grippingly mounting, around the first stringer so as to resist, and preferably to substantially prevent, when so mounted, relative rotation between the first end of the platform and the stringer, about an axis parallel to the length of the platform. Such an arrangement seeks to reduce the risk of the rib bay platform twisting, or flipping over, during use.

The first end may comprises an upper element and a lower element, the upper element being positioned, in use, above the stringer and the lower element, in use, being positioned below the stringer. Such an arrangement tends to limit the possibility of twisting the platform along an axis parallel to the length of the platform.

At least one end of the rib bay platform may comprise a compliant coating (such as a rubber coating) which, during use, touches the stringer. The compliant coating may be arranged to deform, at least to a small extent, thereby acting to reduce the effect of variations in shape along the length, or depth, of the stringer and providing a stable platform. The first end may, alternatively or additionally, be configured so as to form an interference fit with the first stringer. The first end may be arranged to clamp onto the first stringer.

The width of the first end may be over 50%, more preferably over 65% and more preferably over 80% of the width of the platform. The first end preferably forms a continuous structure across that width, but may for example, comprise two spaced-apart structures such as feet.

The second end may be configured identically to the first end of the platform, but is preferably configured differently. The second end may be configured to rest, during use, on the second stringer. The second end may be configured to rest, during use, on the upper surface of the second stringer.

The second end of the platform may be adjustable in height with respect to the main body of the platform and/or the first end. The platform may further comprise a foot located at the second end, the foot being adjustable in height with respect to the platform. Thus the second end may be arranged to compensate for offsets in height between the two stringers.

The rib bay platform may comprise a plurality of feet located at the second end. The outermost feet are preferably separated by a distance of at least 50%, more preferably at least 65%, and yet more preferably at least 80% of the width of the platform.

The area of the platform in contact with a single stringer during use is preferably greater than 100 $mm^2$, more preferably greater than 1600 $mm^2$, and yet more preferably greater than 2000 $mm^2$. The total surface area of the feet which, in use, touches the stringer is preferably greater than 1600 $mm^2$.

At least one foot may be arranged to conform to the shape of the stringer. For example, at least one of the feet may comprise a ball and socket joint to allow the foot to rotate about any axis in the plane of the stringer surface on which it is mounted.

The rib bay platform may comprise a plurality of platform sections slideably mounted for relative movement in a direction along the length of the platform. The platform may comprise a first platform section and a second platform section slideably mounted in relation thereto. The first end of the platform may be defined by the first platform section and the second end of the platform may be defined by the second platform section, or vice versa. The platform may comprise three or more platform sections slideably mounted for relative movement in a direction along the length of the platform. The platform sections may be telescopically mounted on, or in, one another. The platform may comprise a set of runners, for example drawer runners, the sections being arranged on the runners.

The platform may comprise a locking mechanism for preventing, in a locked state, adjustment of the length of the platform. In an embodiment of the invention comprising a set of runners, the locking mechanism may be arranged directly on one of the runners to prevent relative movement of the platform sections. The locking mechanism may comprise a camming arrangement. The locking mechanism may be arranged to be flush with the upper surface of the platform, when in the locked state. The locking mechanism may be in the form of a friction lock.

The platform may comprise an interlocking arrangement along a side of the platform. For example, the platform may comprise a tongue along one edge, and a groove along an opposite edge. The platform may be arranged to co-operate with the appropriate edge of a second, identical rib bay platform. An embodiment of the present invention may thereby enable two rib bay platforms to be connected together side-by-side to form a larger platform.

The upper surface of the platform is preferably coated in a high-grip or anti-slip surface. The platform is preferably of a light-weight, but high strength construction. For example, the majority of the platform by volume may comprise a honeycomb construction.

The platform is suitable for use inside an aircraft rib bay. The platform is preferably greater than 100 mm wide, and more preferably greater than 200 mm wide. The platform is preferably less than 500 mm wide, and more preferably less than 300 mm wide. The platform, when fully extended is preferably greater than 0.6 m long, more preferably greater than 1.0 m long, and yet more preferably more than 1.2 m long. The platform, when fully extended, is preferably less than 1.5 m long. The platform, when fully contracted is preferably greater than 0.4 m long, more preferably greater than 0.6 mm long, and yet more preferably greater than 0.8 m long. The platform, when fully contracted, may be less than 1.0 m long.

The platform is preferably easily maneuverable by the operator at arms length. The platform may weigh less than 7 kg and preferably weighs less than 5 kg, and yet more preferably less than 4 kg.

According to another aspect of the invention, there is provided an aircraft rib bay comprising a first stringer, a second stringer located opposite the first stringer, and a rib bay platform of adjustable length mounted between the first and second stringers. The aircraft rib bay may further comprise a plurality of rib bay platforms arranged in a tiered formation in the rib bay. The rib bay may be a composite rib bay.

It will be appreciated that features described with reference to one aspect of the invention can be incorporated into other aspects of the invention. By way of example, the step of mounting the platform in the method of the present invention may comprise the step of abutting the platform against the base of the stringer.

DESCRIPTION OF THE DRAWINGS

Various embodiments of the invention will now be described, by way of example only, with reference to the accompanying schematic drawings of which.

DETAILED DESCRIPTION

Figure 1:
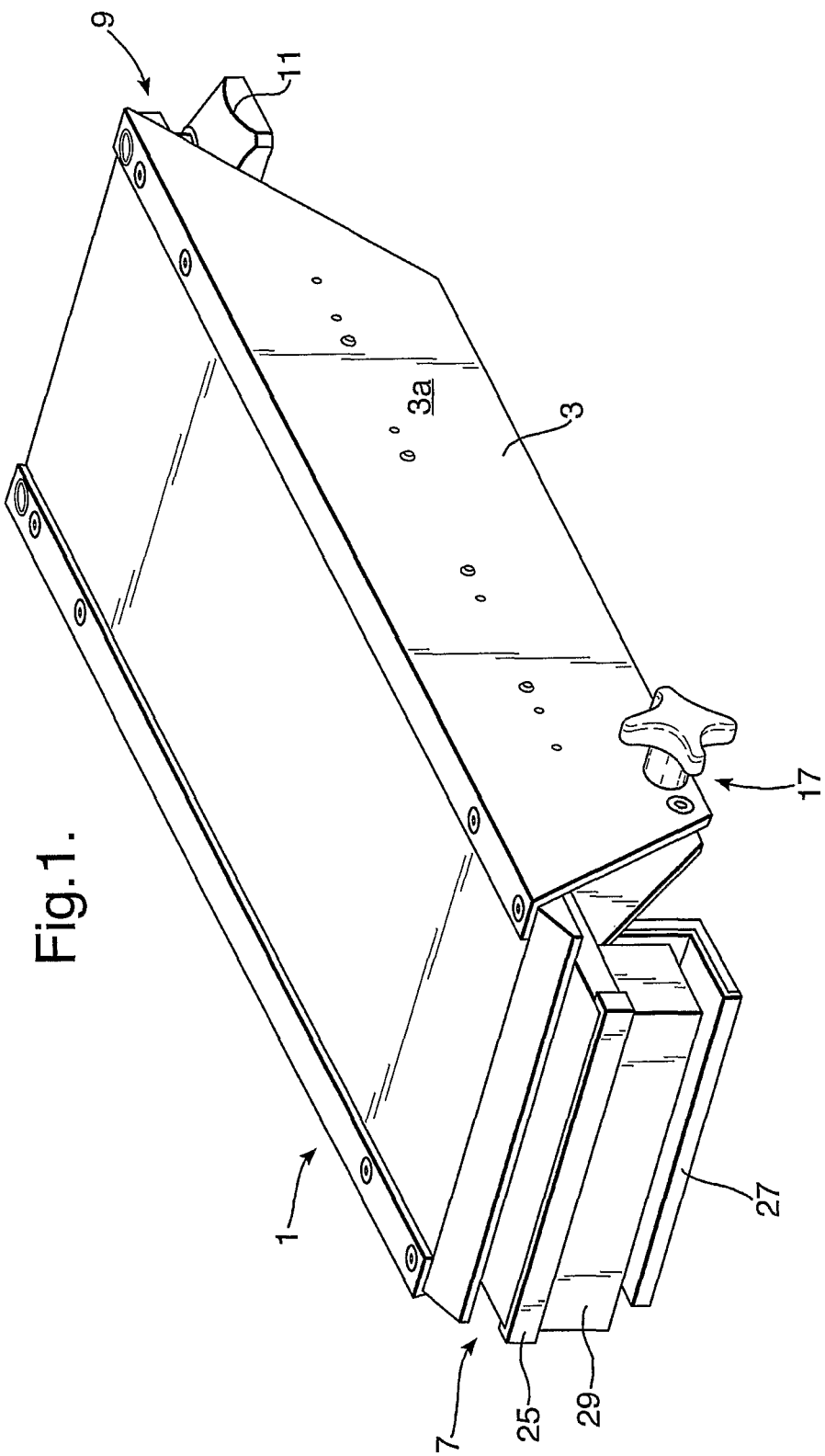
FIG. 1 is a perspective view of a rib bay platform according to a first embodiment of the invention.
Figure 2:
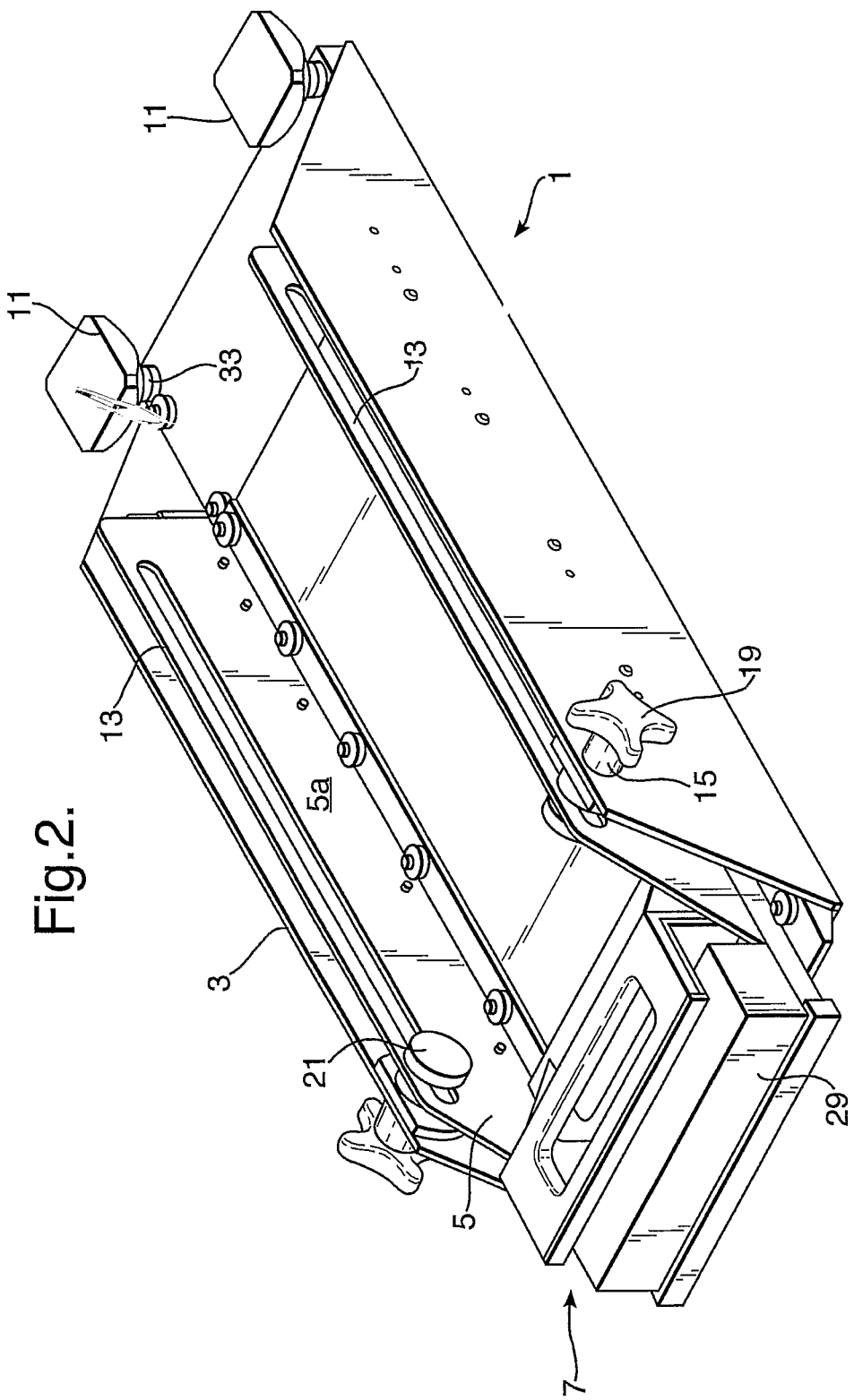
FIG. 2 is a perspective view of the underside of the rib bay platform according to the first embodiment of the invention.

FIGS. 1 and 2 are perspective views of a rib bay platform 1 according to a first embodiment of the invention. The platform (shown in a fully retracted position in FIGS. 1 and 2) comprises two platform sections 3, 5 telescopically mounted for sliding relative to one another. The platform 1 is therefore adjustable in length.

The lower platform section 5 (shown most clearly in FIG. 2) defines a first end 7 configured for grippingly mounting on a rib bay stringer. The upper platform section 3 (shown most clearly in FIG. 1) defines a second end 9 comprising two spaced apart feet 11 configured for resting on another rib bay stringer.

Referring now to the various features of the platform 1 in more detail, the upper and lower platform sections 3, 5 are free to move along their length relative to one another on two sets of metal drawer runners (not shown). The drawer runners can carry loads of up to 90 kg and are located on either side of the lower platform 5 (between the outside of the lower platform side-walls 5a and the inside of the upper platform side-walls 3a).

The rib bay platform 1 has a length of 0.5 m when retracted (see FIGS. 1 and 2) and a length of 0.75 m of when fully extended (not shown). The platform is approximately rectangular in shape and has a width of 200 mm. The rib bay platform weighs 5 kg and is able to carry a maximum operating load of 90 kg. Both the upper and lower platforms are coated in an anti-slip layer (not shown) which in use provides a surface on which the operator may stand with good grip.

The lower platform 5 comprises two runners 13. The runners 13 are positioned on the lower platform section 5 to protect them from damage (which could, for example, cause the runner to deform and narrow). A pin 15 on the upper platform 3 is associated with each runner and protrudes therethrough. The relative movement between the platform sections 3, 5 can be prevented, and therefore the length of the rib bay platform can be temporarily fixed, by using a locking mechanism 17 mounted on the pin 15 engaging each of the runners 13. In the first embodiment of the invention, the locking mechanism 17 is a simple friction lock, comprising a knob 19 mounted on a screw thread on one end of the pin, and a stopper 21 fixedly mounted on the other end of the pin. The locking mechanism 17 is operable between a locked state in which it prevents relative movement between the platform sections, and an unlocked state in which there is free movement between the platform sections 3,5.

The lower platform 5 comprises a first end 7 configured for grippingly mounting on a stringer. As the person skilled in the art will appreciate, a stringer 23 is typically T-shaped in cross-section, and arranged such that the top of the T-shape is attached to the wing skin interior whilst the stem of the T-shape protrudes approximately perpendicularly to the wing skin (see FIGS. 3a and 3b).

The first end 7 of the lower platform comprises an upper element 25 and a lower element 27 which, in use, are positioned either side of the stringer 23 respectively.

A large rubber block 29 is attached to the upper element and is arranged to deform to the surface of the stringer 23 to reduce wobbling in the event that the stringer 23 is uneven. A rubber coating 31 is also applied to the lower element 27, and to the stringer, to prevent damage to the stringer and to spread loads.

Figure 3A:
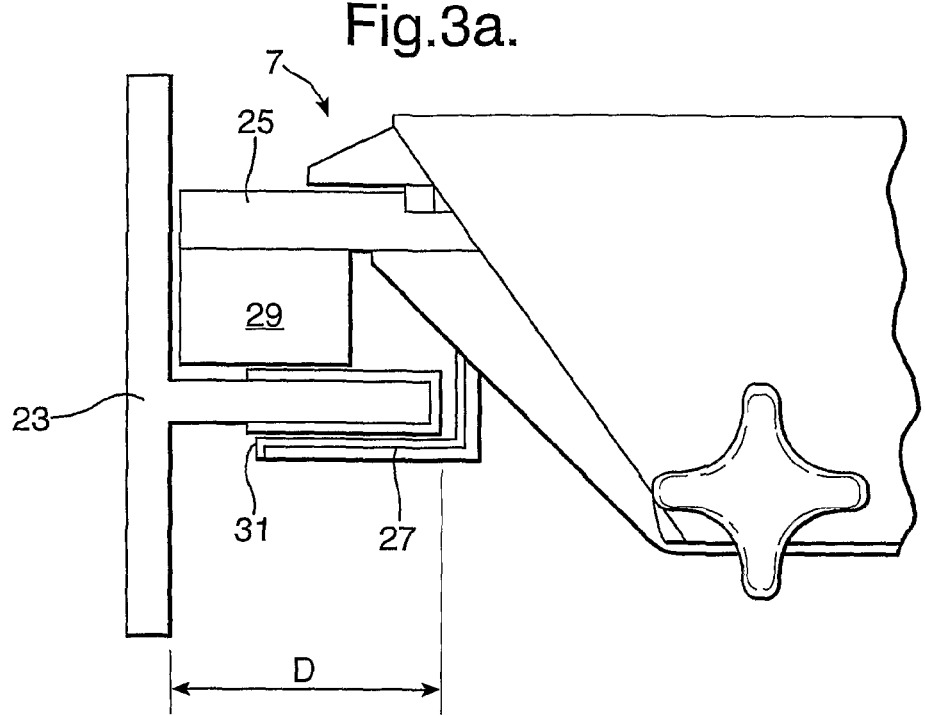
FIGS. 3a and 3b are side views of one end of the rib bay platform of the first embodiment of the invention during use.
Figure 3B:
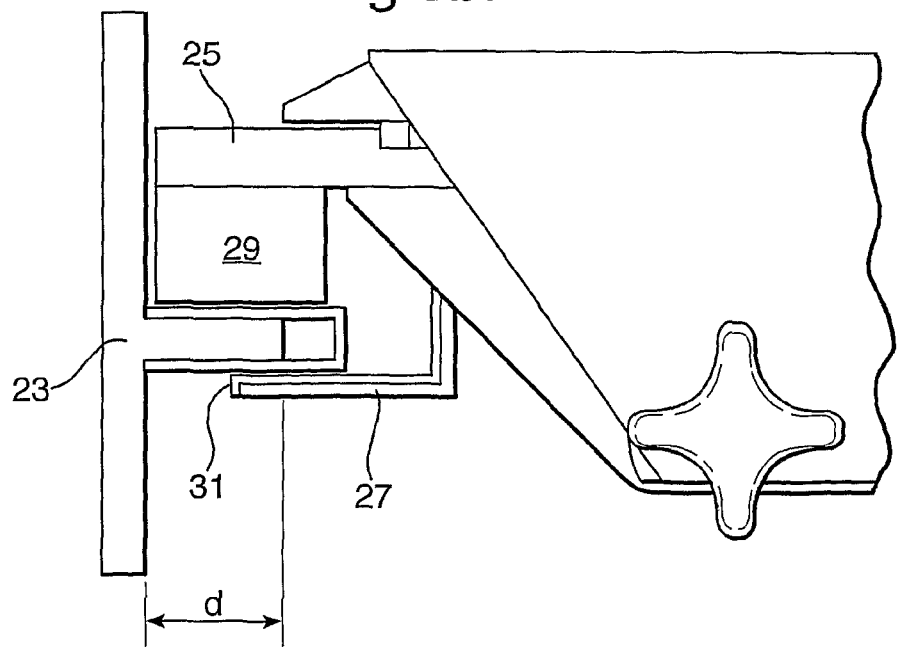

FIGS. 3a and 3b shows a side view of the first end 7 of the platform during use. The first end 7 is grippingly mounted with an interference fit around the stringer 23. This arrangement has two principal advantages. Firstly, the platform 1 is configured to resist relative movement between the first end of the platform and the stringer, in a direction along the length of the platform. The rib bay platform may therefore be mounted onto the stringer at the first end 7 and extended in a direction towards the second stringer without the need to manually hold the platform in place. Secondly, the rib bay platform is configured to prevent any significant relative rotation between the first end of the platform and the stringer, about an axis parallel to the length of the platform. Such an arrangement reduces the risk of the platform twisting, of flipping over, during use.

The rib bay platform according to the first embodiment can be used on a variety of differently sized stringers. FIG. 3a shows the maximum stringer depth D on which the platform can be used (61 mm) and FIG. 3b shows the minimum depth d on which the platform can be used (31 mm). The area of the first end in contact with the upper surface of the stringer is approximately 6000 $mm^2$.

Referring back to FIGS. 1 and 2, the upper platform section 3 comprises two feet 11 positioned at a second end of the platform. The feet are arranged to rest, during use, on a second stringer opposite the first stringer. The centres of the feet 11 are separated from one another by around 90% of the platform width (180 mm). This provides a relatively stable arrangement.

Each foot is mounted on a shaft 33. The shaft 33 is of sufficient length to ensure the feet are approximately level with the rubber block 29 on the first end such that the platform 1 is approximately horizontal during use. The shaft 33 is also threaded such that the height of the foot, relative to the upper platform section, can be altered for fine adjustments. Each foot can therefore be adjusted to ensure the platform is exactly horizontal if need be. Each foot is also mounted on a ball-and-socket joint (not shown) and is therefore able to conform to the local gradient of the stringer.

The feet 11 have approximately square footprints of 40 mm×40 mm to ensure the weight of the platform and operator is spread over an adequate area. Thus, the two feet at the second end present an area of 3200 $mm^2$, some or all of which may be in contact with the stringer. The straight sides of the feet 11 allow the platform to be placed in a position abutting the base of the stringer during use.

To conduct operations inside a wing rib bay (not shown) an operator inserts the rib bay platform 1 (in its retracted form) through a man-access hole in the wing skin and pushes the first end of the platform 1 onto a stringer 23 at the position in the wing at which he would like to be supported.

The first end 7 forms an interference fit around the stringer 23 and prevents both relative movement of the lower platform section 5 and the stringer 23 along the length of the platform, and substantial rotation of the platform 1 about an axis parallel to its length. When mounting the rib bay platform, the first end 7 need not be entirely in the plane of the stringer as the flexibility of the rubber block 29 allows some rotation about the length of the stringer (i.e. the length of the stringer running into the page in FIGS. 3a and 3b).

Once the platform is attached at the first end, the operator pulls (or pushes depending on the direction in which the platform has been inserted) the upper platform section 3 to extend the platform 1 towards a second stringer located on the opposite side of the wing rib bay. The platform telescopically extends until the feet 11 at the second end 9, rest on the opposite stringer and abut its base.

If the second stringer is uneven or has small gradient changes, the operator may need to make adjustments to the position of one or both of the feet, to ensure the platform is horizontal and stable.

Once the feet 11 have been correctly positioned, the operator tightens the locking knob 19, which creates a friction lock and prevents further adjustments to the length of the platform.

The operator can then climb through the man-access hole and support himself on the platform to conduct various activities in the rib bay.

In this embodiment of the invention, the operator, once inside the wing rib bay, assembles three more rib bay platforms on various pairs of stringers, thereby forming a set of tiered steps in the rib bay such that he can easily access a number of different locations. Once he has finished using one of the platforms he unlocks the locking mechanism, retracts the platform, removes it from the stringers and positions it between two other stringers in the rib bay.

According to a second embodiment of the invention (not shown) the platform is substantially as described with reference to FIGS. 1-3b except for the differences described below.

The platform has a length of 0.65 m when retracted and a length of 1.2 m of when fully extended.

The platform has a groove along the length of one edge and a tongue along the length of the opposite edge. The tongue is arranged to receive the groove of an identical platform. Two platforms according to the second embodiment may therefore be arranged side-by-side (at the same chordwise location) to form a single, larger platform.

According to another embodiment (not shown), the locking mechanism comprises a camming arrangement (similar to a quick-release lever on a bike) on the upper platform section. When locked, the lever is flush with the upper surface of the platform and sliding movement between the platform sections is prevented. When unlocked, the lever protrudes for ease of access and the platform sections are free to slide relative to one another. In this embodiment, there is only one locking mechanism and it is mounted centrally across the width of the platform.

Whilst the present invention has been described and illustrated with reference to particular embodiments, it will be appreciated by those of ordinary skill in the art that the invention lends itself to many different variations not specifically illustrated herein. For example, the platform may comprise three or more platform sections, each slideably mounted with respect to one another. Alternatively or additionally, the ends of the platform may comprise a locking member in the form of a clamp for grippingly mounting on a stringer at one or both ends.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of operating in an aircraft wing rib bay, comprising the steps of:
   providing a rib bay platform of adjustable length;
   adjusting the length of the platform so as to match the distance between two stringers located on the respective internal surfaces on either side of the rib bay;
   mounting the platform between the two stringers whereby a person may then operate inside the aircraft rib bay whilst being supported on the platform; and
   adjusting the horizontal orientation of the rib bay platform by means of adjustment of the height of at least one end of the platform in relation to a corresponding stringer on which it is supported.

2. A method according to claim 1, wherein the method comprises a step of grippingly mounting one end of the platform on one of the two stringers.

3. A method according to claim 2 comprising the step of extending the platform, once so mounted, towards the other stringer.

4. A method according to claim 1, comprising the steps of:
   providing a second platform of adjustable length;
   adjusting the length of the second platform so as to match the distance between two stringers located on either side of the rib bay; and
   mounting the second platform between the two stringers.

5. A method according to claim 4, wherein the second platform is mounted at a different location along the chord and span of the wing from the other platform, thereby forming a tiered arrangement of platforms.

6. A method according to claim 4, wherein the second platform is mounted at the same chordwise location in the rib bay as the other platform.

7. An aircraft wing rib bay comprising a first stringer on one internal surface, a second stringer located on an opposite internal surface, and a rib bay platform of adjustable length mounted between the first and second stringers, wherein said rib bay platform is adjustable in length and comprises:
   a first end of said platform configured for mounting on said first stringer of the rib bay,
   a second end of said platform configured for mounting on said second stringer of the rib bay, and
   a foot located at the second end, the foot adjustable in height with respect to the platform and thereby allowing the platform to be adjusted in the horizontal plane.

8. An aircraft rib bay according to claim 7, wherein the first end is configured for grippingly mounting on the first stringer.

9. An aircraft rib bay according to claim 7, wherein the first end is configured for mounting around the first stringer so as to resist relative rotation between the first end of the platform and the first stringer, about an axis parallel to the length of the platform.

10. An aircraft rib bay according to claim 7, wherein the first end is configured so as to form an interference fit with the first stringer.

11. An aircraft rib bay according to claim 7, wherein the width of the first end is over 80% of the width of the platform.

12. An aircraft rib bay according to claim 7, wherein the second end is configured to rest on the second stringer.

13. An aircraft rib bay according to claim 12, said platform including a plurality of feet located at the second end, the outermost feet being separated by a distance of at least 80% of the width of the platform.

14. An aircraft rib bay according to claim 12, wherein at least one foot is arranged to conform to the shape of the stringer.

15. An aircraft rib bay according to claim 7, wherein the platform comprises a plurality of platform sections slideably mounted for relative movement in a direction along the length of the platform.

16. An aircraft rib bay according to claim 15, wherein the platform sections are telescopically mounted.

17. An aircraft rib bay according to claim 7, wherein the platform further includes a locking mechanism for preventing adjustment of the length of the platform.

\* \* \* \* \*